(12) United States Patent
Rolle et al.

(10) Patent No.: US 6,203,751 B1
(45) Date of Patent: Mar. 20, 2001

(54) METHOD AND APPARATUS FOR PRODUCING OPEN CONTAINERS FROM FOAM SHEETING

(75) Inventors: Jean-Claude Rolle, Bulle (CH); Kurt Sjödin, Lund (SE)

(73) Assignee: Convenience Food Systems B.V. of the Netherlands, En Bakel (NL)

( * ) Notice: Subject to any disclaimer, the term of this patent is extended or adjusted under 35 U.S.C. 154(b) by 0 days.

(21) Appl. No.: 09/117,818
(22) PCT Filed: Jan. 31, 1997
(86) PCT No.: PCT/EP97/00419
§ 371 Date: Nov. 4, 1998
§ 102(e) Date: Nov. 4, 1998
(87) PCT Pub. No.: WO97/28942
PCT Pub. Date: Aug. 14, 1997

(30) Foreign Application Priority Data

Feb. 7, 1996 (CH) .................................................. 316/96

(51) Int. Cl.[7] .......................... B29C 51/10; B29C 51/30
(52) U.S. Cl. .................. 264/554; 264/321; 425/387.1; 425/388; 425/405.1; 425/412
(58) Field of Search ................................. 425/405.1, 423, 425/387.1, 388, 412; 264/321, 554

(56) References Cited

U.S. PATENT DOCUMENTS

| | | | | |
|---|---|---|---|---|
| 2,953,814 | * | 9/1960 | Mumford | 264/554 |
| 3,415,089 | * | 12/1968 | Ferchland | 425/405.1 |
| 3,432,380 | * | 3/1969 | Weber | 264/321 |

(List continued on next page.)

FOREIGN PATENT DOCUMENTS

WO 95/14565  6/1995  (WO) .

OTHER PUBLICATIONS

Patent Abstract of Japan: Publication No. 61258725, Publication Date Nov. 17, 1986, Inventors: Masato, Y. and Koji, G., Applicant, Sekisui Plastics Co Ltd., Title: Thermoforming of Foamed Sheet.

*Primary Examiner*—Allan R. Kuhns
(74) *Attorney, Agent, or Firm*—Oppedahl & Larson LLP

(57) ABSTRACT

The inventive method serves for producing open containers from a flat sheeting (4) consisting of a foam material or containing at least one layer of such a material, by drawing the sheeting with the help of a female (2) and a male tool (1) and by expanding the foam material with the help of a pressure reduction. The action sequence of one cycle of the inventive method is e.g. the following: positioning and clamping the sheeting (4) over the opening of the recess in the female tool (2); moving the male tool (1) into the recess and at the same time prestretching the sheeting with the help of a pressure difference between its two sides, such that the face of the male tool (1) gets in contact with the prestretched sheeting inside the recess; drawing the sheeting further by moving the male tool (1) to its end position in the recess of the female tool (2) and at the same time reducing the pressure on the female tool side or on both sides of the sheeting such that it reaches a value below ambient pressure which is sufficiently low for expanding the foam material and keeping the reduced pressure until the sheeting is cooled below plastication temperature; then equalizing the pressure and demolding and declamping the formed container and advancing the sheeting for a further method cycle.

20 Claims, 3 Drawing Sheets

U.S. PATENT DOCUMENTS

| | | | | |
|---|---|---|---|---|
| 3,484,510 | * | 12/1969 | Corazza | 264/554 |
| 3,742,537 | * | 7/1973 | Merrill | 425/405.1 |
| 3,817,806 | * | 6/1974 | Anderson et al. | 264/554 |
| 3,855,657 | * | 12/1974 | Mazzotta | 425/405.1 |
| 4,382,767 | * | 5/1983 | Naugle et al. | 425/388 |
| 4,383,815 | * | 5/1983 | Kiefer et al. | 425/405.1 |
| 4,728,559 | * | 3/1988 | Hardenbrook et al. | 264/321 |
| 4,867,924 | * | 9/1989 | Schilkey et al. | 425/405.1 |
| 4,878,826 | * | 11/1989 | Wendt | 425/423 |
| 5,362,436 | | 11/1994 | Wagner | 264/321 |
| 5,364,696 | | 11/1994 | Wagner | 428/318.6 |
| 5,427,732 | * | 6/1995 | Shuert | 425/388 |
| 5,529,472 | * | 6/1996 | Jenkins | 425/388 |
| 5,641,524 | * | 6/1997 | Rush et al. | 425/387.1 |
| 5,773,540 | * | 6/1998 | Irwin et al. | 425/387.1 |
| 5,891,387 | * | 4/1999 | Rolle | 264/554 |

* cited by examiner

METHOD AND APPARATUS FOR PRODUCING OPEN CONTAINERS FROM FOAM SHEETING

The invention is in the field of the packaging industry and relates to a method according to the generic part of the first independent claim and to an apparatus according to the generic part of the corresponding independent claim for carrying out the inventive method. Method and apparatus serve for producing open containers from a thermoformable flat sheeting which consists of a foam material or contains at least one foam layer.

Cups, trays and similarly shaped containers with a bottom wall and a side wall (or side walls) are produced according to the state of the art by drawing or deep drawing flat thermoformable sheeting which may consist of a foamed material or may contain at least one layer of such a material. The sheeting is heated to a temperature at which it is thermoformable and at this temperature it is formed usually by a cooperating pair of a female and a male forming tool which tools are moved relative to each other. This drawing process may be assisted by a difference of pressure between the two sides of the sheeting.

A container produced by drawing or deep drawing of a sheeting with a uniform thickness, will have a wall thickness which is not uniform but varies between a thickness which is substantially the same as the original thickness of the sheeting in areas where the sheeting was drawn only little and a substantially reduced thickness in areas where the sheeting was strongly drawn. Depending on which element (male tool, female tool, pressure difference) is the primary forming element, the areas with a reduced wall thickness are located differently on the finished container. In a forming process in which the male tool is the principal actor, the side wall of the container is thin, the bottom wall having more or less the original thickness of the sheeting. This is due to the fact that the face of the male tool comes into contact with the sheeting when it is not deformed yet, and impedes sliding of the sheeting in the contacting area and therefore impedes drawing in this area also. If the main actor is a pressure difference (lower pressure on the female tool side) the side wall of the produced container shows a higher thickness than the bottom wall.

Furthermore, it is known to the one skilled in the art that flat foam sheeting or items made of such sheeting can be expanded in order to increase their wall thickness. Such expansion is achieved by again heating the sheet material to a temperature at which it is thermoformable and then applying a reduced pressure to at least one of its surfaces. Caused by the vacuum surrounding the sheeting and by the plasticated state of the material, the gas filled pores of the foam expand and with this the thickness of the sheeting increases. For stabilizing the foam in its expanded state, the material is cooled down before ambient pressure is established.

Expanded areas of a flat sheeting or of a container wall respectively have, compared with their not expanded state, an increased thickness and a reduced density. Therefore these areas usually have a higher buckling strength i.e. are stiffer and harder to bend or to buckle compared with the original (not expanded) state.

The publications U.S. Pat. No. 3,846,526 and JP-60192615 show each a process and an apparatus for producing open containers in a drawing or deep drawing step, followed by an expansion step in which expansion step the side wall is expanded for more insulating capacity (U.S. Pat. No. 3,846,526) or the upper edge of the side wall is expanded for forming a thickened collar region for facilitating stacking of such containers by positioning them inside each other. According to both named publications, the expanding step is introduced between the drawing step and the cooling step such that the container material does not need reheating for the expansion step but such that the expansion step adds to the total cycle time necessary for producing the container.

It is now the object of the invention to create a method for producing open containers with a bottom wall and a side wall (or side walls) from a sheeting of a thermoformable material usually having a uniform thickness which sheeting consist of an expandable foam material or contains at least one layer of such a material, in which method drawing and expanding are combined and controlled, such that the container walls regarding mechanical properties such as e.g. buckling strength are sufficient for a specific container function, such that the weight of the container is at a minimum and such that the cycle time necessary for producing the container is at a minimum too. Furthermore, it is an object of the invention to create an apparatus for carrying out the inventive method.

This object is achieved by the method and by the apparatus for carrying out the method as defined by the claims.

The inventive method consists of a combination of three techniques: drawing by applying a pressure difference, drawing by applying a tool and expanding foam material by applying vacuum, whereby for producing containers with a small drawing ratio and/or with a form causing little problems the application of the pressure difference may be omitted.

The three (or two) techniques are combined in a specific sequence to be described further on. The inventive method is carried out with the help of a male tool movable into the recess of a female tool. The male tool in its end position and the recess of the female tool form together a cavity which substantially corresponds to the container to be produced.

The inventive method is usually carried out in cycles whereby in each cycle one area of a quasi endless web of sheeting is processed to be formed into one container or into a plurality of containers. An exemplified action sequence of one cycle of the inventive method is substantially the following:

positioning a web of sheeting between male tool and female tool;

clamping the sheeting around the opening of the recess of the female tool;

moving the male tool towards the female tool and into the recess of the female tool and at the same time pre-stretching the sheeting by subjecting it to a pressure difference (lower pressure on the female tool side), such that the face of the male tool gets in contact with the prestretched sheeting inside the recess;

drawing the sheeting by further moving the male tool with its face in contact with the sheeting to its end position in the recess of the female tool and, during this further movement of the male tool, starting to reduce the pressure on at least one side of the sheeting such that a pressure which is sufficiently low for expanding the foam material is achieved when the male tool reaches its end position or very shortly afterwards;

leaving the formed container to cool to a temperature below the temperature range for thermoforming whilst keeping the tools in the same position and keeping the pressure on the at least one side of the sheeting at its value reduced for expansion of the foam material;

equalizing the pressure, demolding and declamping the formed container by moving the tools away from each other;

advancing the web in order to remove the formed container from between the tools and to position a further area of sheeting between the tools.

The clamping of the sheeting before thermoforming is not obligatory. If the sheeting is not clamped it might be drawn from the areas around the recess into the recess. If this is not acceptable, the sheeting must be clamped around the recess before prestretching or drawing respectively starts. Clamping of the sheeting may be effected with corresponding tools either around each recess or around a plurality of recesses.

For forming containers with a low drawing ratio (depth divided by top diameter is considerably below one) and/or with a shape that causes little drawing problems (round, not very steep side walls), good results can also be achieved without prestretching, i.e. the male tool contacts the unstretched sheeting and serves as only, drawing actor. In such a case, the same as in a process with prestretching, the reduction of the pressure on at least one side of the sheeting starts during the movement of the male tool such that a pressure low enough for expansion (expansion pressure) is achieved when the male tool reaches its end position or immediately afterwards.

BRIEF DESCRIPTION OF THE DRAWINGS

The inventive method and the apparatus for carrying out the inventive method are described in more detail with the help of the following Figures, wherein.

DETAILED DESCRIPTION OF THE INVENTION

Figure 1:
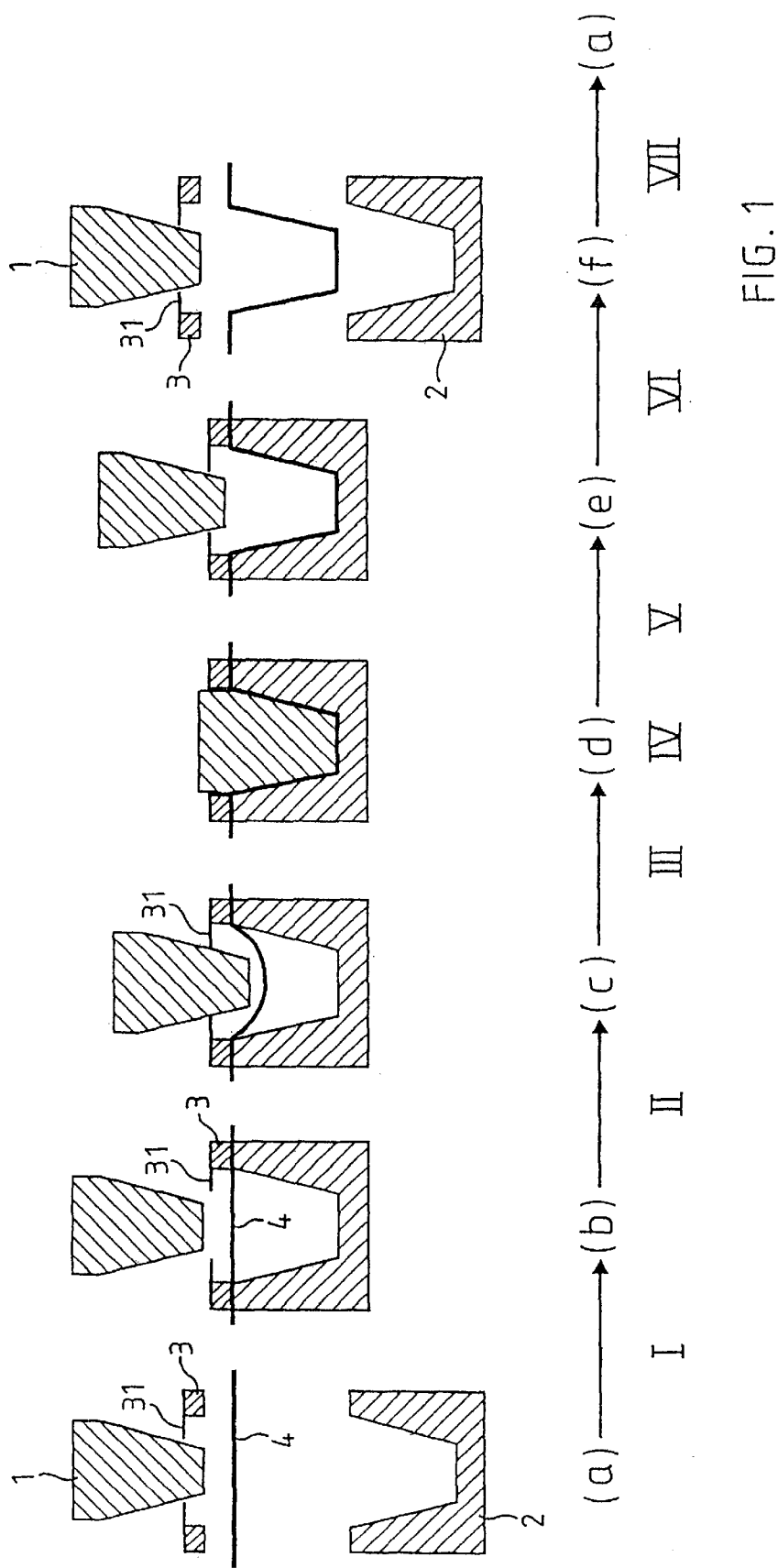
FIG. 1 shows the step sequence of one cycle of an exemplified variant of the inventive method by showing subsequent positions of tools and sheeting or formed container respectively.

FIG. 1 shows in schematic cross section six subsequent positions (a) to (f) of exemplified tools and sheeting during one cycle of an exemplified variant of the inventive method for producing open containers from thermoformable sheeting containing at least one layer of a foamed expandable material, which sheeting usually has a uniform thickness.

The shown male tool 1, female tool 2 and clamping tool 3 are all part of a substantially known drawing apparatus, which also contains a frame, drives for moving the tools relative to each other, control means for controlling the drives in a coordinated manner, means for positioning and advancing the sheeting 4 between forming cycles and, if required, devices for reducing or increasing the pressure between the tools in a controlled manner. All parts of the drawing apparatus except male tool 1, female tool 2 and clamping tool 3 are not shown in FIG. 1.

Position (a) is the starting position. Male tool 1 and female tool 2 are positioned coaxially and at a distance from each other, the recess of the female tool facing the face of the male tool. The sheeting 4 is positioned between the two tools 1 and 2 at a distance from each of the tools. The clamping tools 3 are in a rest position on the male tool side of the sheeting and at a distance from it.

The first action I is clamping the sheeting between an annular clamping tool on the male tool side of the sheeting and the annular edge around the opening of the recess of the female tool on the other side. Position (b) is the position of the tools after clamping.

The second action II is prestretching the sheeting, i.e. stretching the sheeting into the recess of the female tool by establishing a pressure difference between the two sides of the sheeting (lower pressure on the female tool side). During prestretching, the male tool is moved towards and into the recess of the female tool such that the face of the male tool contacts the prestretched sheeting inside the recess of the female tool. Position (c) is the position of the tools just before contact between male tool and prestretched sheeting.

The third action III is drawing, i.e. drawing the prestretched sheeting to form the container by moving the male tool with its face in contact with the sheeting to its end position inside the recess of the female tool. During this action III, on at least one side of the sheeting the pressure is reduced such that it reaches a value (expansion pressure), which is low enough for expanding the at least one foam layer of the sheeting, when the male tool reaches its end position or immediately afterwards. Position (d) is the end position of the male tool.

The forth action IV is expanding the foam in the sheeting and cooling the formed container whereby expansion pressure is maintained and the position of the tools is not changed, i.e. is still position (d).

The fifth action V is demolding of the formed container by moving the male tool out of the recess; position (e). During this fifth action, the drawn container or containers formed in the cycle may be separated from the web and from each other by punching. Separation may also be carried out later.

The sixth action VI is declamping and finally completely demolding the formed container by moving the clamping tools 3 into their rest position and by moving the female tool to its starting position; position (f).

The seventh action VII is advancing the web such that the formed container is removed from between the tools and a further area of flat sheeting is positioned for a further forming cycle; position (a).

Figure 2:
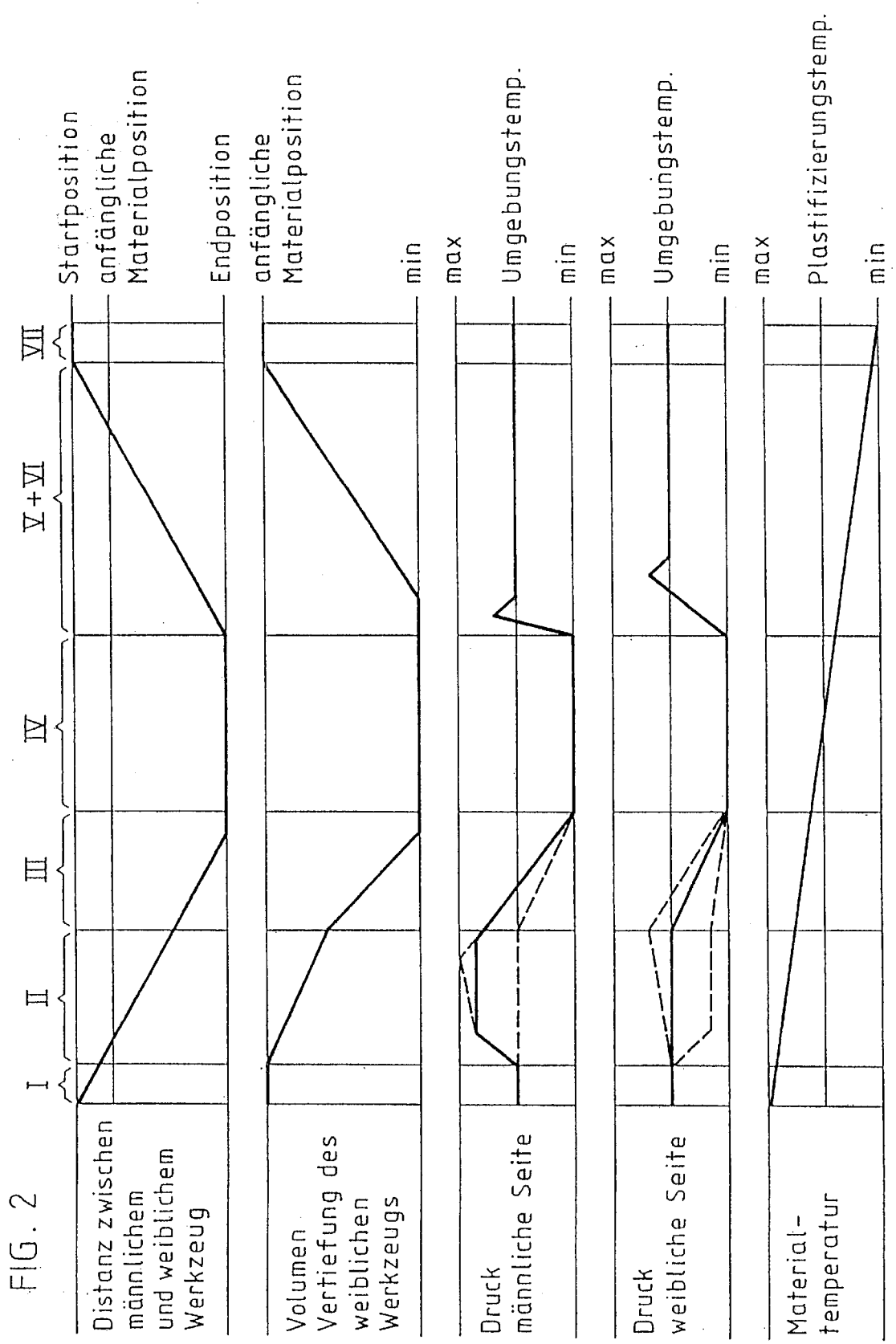
FIG. 2 shows the step sequence of one cycle of the method variant according to FIG. 1 by showing the course of the main method parameters.

FIG. 2 shows the step sequence of the inventive method by showing the course of the main method parameters during one cycle of the method variant as illustrated by FIG. 1. These method parameters are:

the distance between the face of the male tool and the bottom of the recess of the female tool between the starting position and the end position of the male tool (intermediate: initial sheeting position, i.e. position of the sheeting before prestretching), the volume of the recess in the female tool closed by the sheeting, between the volume with initial (flat) sheeting position and the minimum volume corresponding to the cavity volume, the pressure on the male tool side of the sheeting between a maximum and a minimum (intermediate: ambient pressure), whereby the minimum pressure is the expansion pressure, the pressure on the female tool side of the sheeting between a maximum and a minimum (intermediate: ambient pressure), whereby the minimum pressure is the expansion pressure and the temperature of the sheeting between a maximum and a minimum (intermediate: plastication temperature or lower temperature limit for drawing and expanding).

FIG. 2 does not give actual values but shows the course of the above named parameters during one cycle of the described variant of the inventive method. On the top of FIG. 2 the sequence of actions is indicated in the same manner as in FIG. 1 (I: clamping, II: prestretching; III: drawing; IV: expanding and cooling; V and VI: demolding and declamping; VII: forwarding).

The first and second method parameter shown in FIG. 2 are dependant only on the position of tools and sheeting, i.e. visible in FIG. 1 also.

The third and forth method parameters shown in FIG. 2 are the pressures on both sides of the sheeting. These are both ambient for clamping (action I). As soon as the sheeting is clamped, for prestretching (action II) a pressure difference is established between the two sides of the sheeting, whereby the pressure on the female tool side is lower than the pressure on the male tool side. The pressure difference is to be adapted to the strength of the sheeting to be stretched.

The pressure difference for prestretching can be achieved (as indicated with unbroken lines) by increasing the pressure on the male tool side and keeping the pressure on the female tool side substantially unchanged. The increase in pressure on the male tool side is either achieved by blowing pressurized air from nozzles situated e.g. in the face area of the male tool or on the clamping tool, by closing the room around the male tool with appropriate closing means (31, indicated in FIG. 1) e.g. fixed to the clamping tool such that the moving male tool decreases the volume between the sheeting and the closing means such increasing the pressure, or by a combination of the named two methods for increasing the pressure on the male tool side of the sheeting. The female tool side of the sheeting may be open to ambient pressure such that pressure on this side stays ambient.

If the female side of the sheeting is closed, pressure rises on this side also due to the decrease in volume, such that for maintaining the necessary pressure difference, the pressure on the male tool side needs to be controlled accordingly (upper broken lines in the courses of the two pressures).

Instead of increasing the pressure on the male tool side of the sheeting and keeping the pressure on the female tool side substantially constant, as described above, the pressure difference necessary for prestretching may be achieved also by keeping the pressure on the male tool side substantially ambient (no closing means 31) and by reducing the pressure on the female tool side by actively removing air from the recess (lower broken lines in the courses of the two pressures).

As soon as the face of the moving male tool contacts the prestretched sheeting, prestretching is terminated and drawing (action III) commences. This means that the sheeting is, mainly by the action of the moving male tool, drawn further into the recess. During this phase, the pressure difference between the two sides of the sheeting is gradually equalized and the pressure on both sides of the sheeting is reduced to a pressure which is low enough for expanding the foam material. Pressure reduction on only one side, e.g. the female side is also possible.

The pressure reduction is controlled in such a way that expansion pressure is reached when the male tool reaches its end position (end of drawing) or immediately afterwards.

When the male tool has reached its end position and expansion pressure is established, expansion and cooling (action IV) commence. Expansion pressure is maintained until the temperature of the sheeting is low enough for the material to be solid enough for resisting shrinking due to mounting pressure. Then the cavity between male and female tool is opened on both sides of the formed container for equalizing the pressure and the formed container is demolded and declamped (actions V and VI) whereby demolding may be assisted by a short increase of the pressure on the side of one or of both tools.

The last parameter whose course is shown in FIG. 2 is the sheeting temperature. This temperature must be above the plastication temperature of the sheeting material before prestretching starts and below the plastication temperature before demolding and declamping starts.

To achieve such a temperature course, usually the sheeting is preheated before being advanced between the tools to a temperature above the plastication temperature of the sheeting material and low enough for enabling the sheeting to be handled safely. The tools or at least one of the tools is kept at a constant elevated temperature which is below the plastication temperature of the sheeting material. The initial sheeting temperature and the tool temperature are to be set corresponding with the thermal characteristics of the sheeting material and with the movement of the tools such that the sheeting temperature is above plastication temperature until shortly after the male tool has reached its end position and such that the time necessary for cooling the formed container after drawing and expanding is minimized.

For producing containers of a sheeting consisting of a polypropylene foam which sheeting is described in a copending application (same application date as present application) the following process parameter are applicable:

initial sheeting temperature: at least 160° C.

expansion pressure: 0.2 atm absolute or lower.

Figure 3:
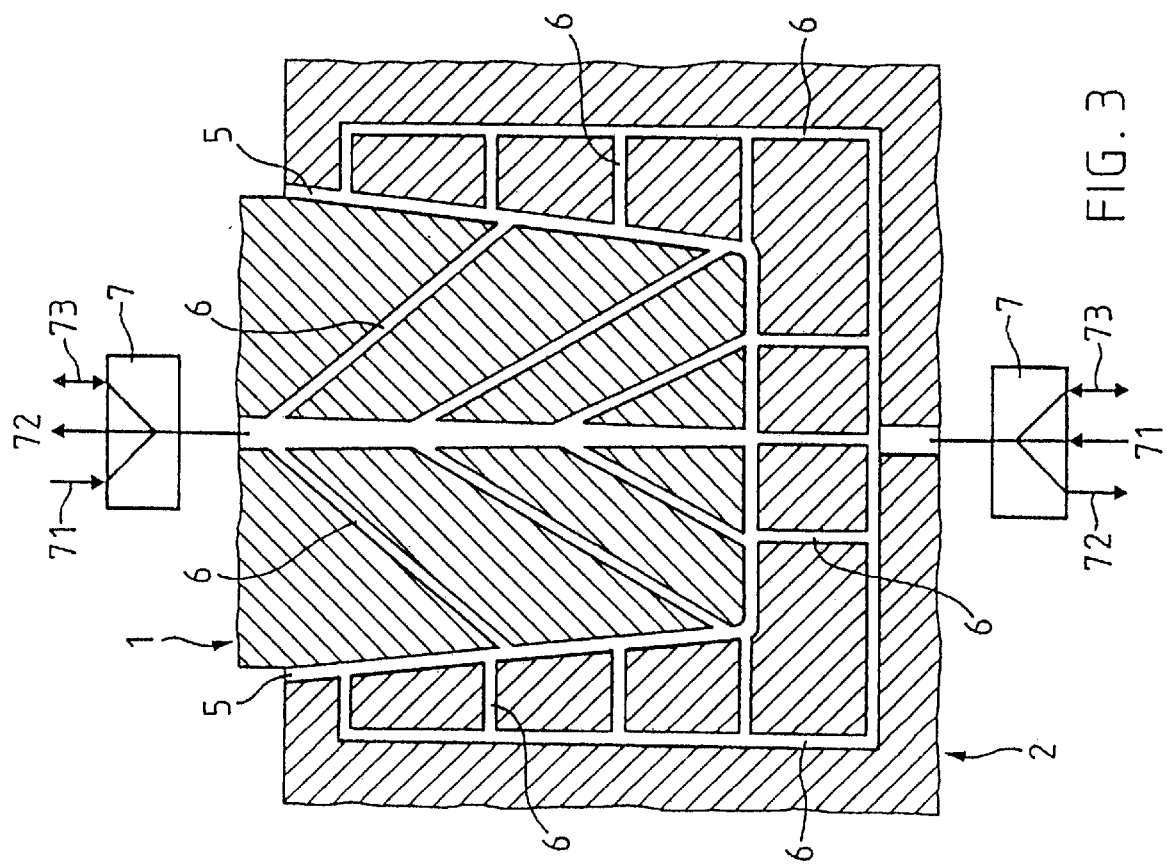
FIG. 3 shows in a schematic manner a male and a female tool and the cavity between the tools for producing a cup as an exemplified open container.

With the inventive method it is possible to produce open containers with shapes freely selectable within a very wide range and with a material distribution and a wall thickness according to specific requirements if the sheeting a chosen accordingly, the cavity is shaped accordingly and the movement of the tools together with the course of the process parameters is controlled accordingly FIG. 3 shows in cross section and in a larger scale than FIG. 1, a pair of tools (male tool 1 and female tool 2) for carrying out the inventive method. The relative position of the two tools corresponds to the end position (positions (d) or (e) in FIG. 1). The cavity 5 between the two tools is, after the drawing and expansion at least partly filled with the sheeting material. For most applications the shape of a container produced in the cavity will correspond substantially to the shape of the cavity.

The width of cavity 5 (substantially corresponding to the wall thickness of the container to be formed) is to be designed according to thickness and density of the original sheeting, according also to the drawing rate and to mechanical, thermal and further requirements on the container to be formed. The cavity will be wider than the thickness of the drawn sheeting (without expansion) and less wide than the thickness of the sheeting in a maximally expanded state, which can be as much as four to ten times the thickness of the sheeting in a non-expanded state.

For regulating the pressure on both sides of the sheeting, male and female tool are equipped with a system of channels 6 with open ends (nozzles) on the cavity walls. By means of at least two control valves 7 or similar controllable devices, one each on the male and on the female side, these channels are selectably connectable to a source of pressurized air 71, to a source of reduced pressure 72 and/or to ambient pressure 73. The control of the valves is to be coordinated with the control of the drives moving the tools in order to achieve e.g. a course of pressure according to FIG. 2.

Figure 4:
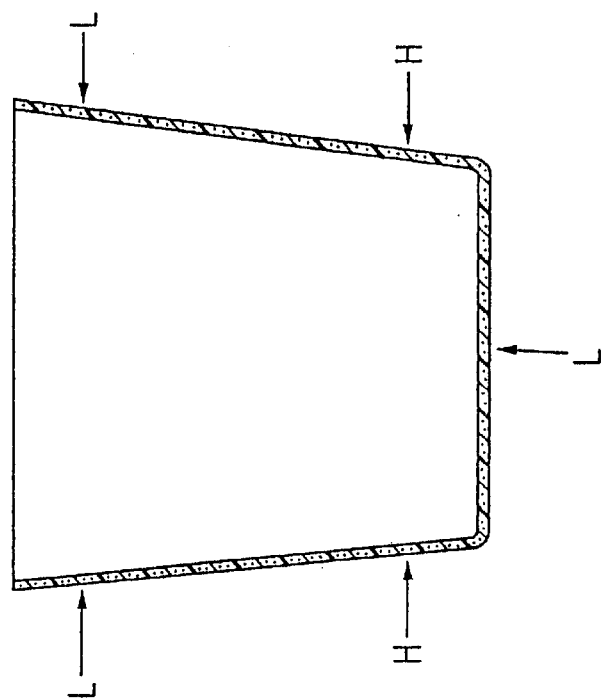
FIG. 4 shows the cup produceable with the tools according to FIG. 3.

FIG. 4 shows an open container in cross section and made according to the method variant of the inventive method as described in connection with FIGS. 1 and 2. The container cross section corresponds to the cross section of the cavity 5 between male tool 1 and female tool 2 (FIG. 3) apart from eventual thermal shrinking. The container has e.g. a uniform thickness. As the sheeting is drawn during prestretching mostly in its central area (bottom wall of the container) and during drawing in its peripheral area (top of the side wall), the material density in the cup is relatively low in areas designated with L and relatively high in areas designated with H. For an optimal material distribution (density variation at a minimum) the exact settings of the method parameters have to be evaluated with corresponding experiments.

What is claimed is:

1. Method for forming open containers from a flat thermoformable sheeting (4) consisting of foam material or containing at least one layer of such material with the help of a cooperating pair of a female tool (2) with a recess and a male tool (1) movable into the recess of the female tool (2) thereby drawing the flat sheeting (4) positioned over the opening of the recess and having an elevated temperature above its plastication temperature, wherein during the movement of the male tool (1) towards the female tool (2) and to its end position in the recess of the female tool thereby contacting and drawing the sheeting, the pressure on at least one side of the sheeting is reduced such that it reaches a value below ambient pressure which is low enough for expanding the foam material when the male tool (1) is reaching or has just reached its end position and that the reduced pressure is maintained until the sheeting temperature is below the plastication temperature of the foam material, characterized in that the sheeting positioned over the recess of the female tool is prestretched into the recess with the help of a pressure difference between the male tool side of the sheeting and the female tool side, such that the face of the moving male tool (1) contacts the sheeting inside the recess.

2. Method according to claim 1, characterized in that for expansion the pressure is reduced only on the female tool side of the sheeting or on both sides of the sheeting.

3. Method according to claim 1, characterized in that the sheeting positioned over the recess of the female tool is prestretched into the recess with the help of a pressure difference between the male tool side of the sheeting and its female tool side, such that the face of the moving male tool (1) contacts the sheeting inside the recess.

4. Method according to claim 3, characterized in that for prestretching the pressure on the male tool side of the sheeting (4) is increased and the pressure on the female tool side of the sheeting is kept substantially ambient.

5. Method according to claim 4, characterized in that the pressure on the male tool side of the sheeting is increased by pressing pressurized air through nozzles positioned at least in the area of the face of the male tool (1).

6. Method according to claim 4, characterized, in that the pressure on the male tool side of the sheeting is increased by establishing tight closing means (31) around the moving male tool.

7. Method according to claim 3, characterized in that for prestretching the pressure on the female tool side of the sheeting (4) is reduced by removing air from the recess and the pressure on the male tool side of the sheeting is kept substantially ambient.

8. Method according to claim 1, characterized in that a cavity (5) between the female tool (2) and the male tool (1) in its end position is at least as wide as the drawn sheeting and not wider than the thickness of the drawn sheeting in a state of maximal expansion.

9. Apparatus for carrying out the method according to any one of claims 1 to 8, which apparatus contains a male tool (1) with a face and a female tool (2) with a recess, whereby the male tool is movable from a starting position at a distance from the female tool to an end position in the recess of the female tool, characterized in that male tool (1) and female tool (2) contain channels (6) opening in nozzles towards the cavity between male tool and female tool and being selectably connectable for the male tool to at least a source of reduced pressure (72) and for the female tool side to at least an opening to ambient pressure (73) and a source of reduced pressure (72), with the help of a switching device (7) which is controllable in cooperation with the relative movement between male tool (1) and female tool (2).

10. Apparatus according to claim 9, characterized in that the channels (6) in the male tool are in addition connectable to a source of pressurized air (72).

11. Apparatus according to claim 9, characterized, in that the channels (6) in the female tool (2) are in addition connectable to a source of pressurized air (71).

12. Method according to claim 2, characterized in that for prestretching the pressure on the male tool side of the sheeting (4) is increased and the pressure on the female tool side of the sheeting is kept substantially ambient.

13. Method according to claim 2, characterized in that for prestretching the pressure on the female tool side of the sheeting (4) is reduced by removing air from the recess and the pressure on the male tool side of the sheeting is kept substantially ambient.

14. Method according to claim 2, characterized in that a cavity (5) between the female tool (2) and the male tool (1) in its end position is at least as wide as the drawn sheeting without expansion and not wider than the thickness of the drawn sheeting in a state of maximal expansion.

15. Method according to claim 3, characterized in that a cavity (5) between the female tool (2) and the male tool (1) in its end position is at least as wide as the drawn sheeting without expansion and not wider than the thickness of the drawn sheeting in a state of maximal expansion.

16. Method according to claim 4, characterized in that a cavity (5) between the female tool (2) and the male tool (1) in its end position is at least as wide as the drawn sheeting without expansion and not wider than the thickness of the drawn sheeting in a state of maximal expansion.

17. Method according to claim 5, characterized in that a cavity (5) between the female tool (2) and the male tool (1) in its end position is at least as wide as the drawn sheeting without expansion and not wider than the thickness of the drawn sheeting in a state of maximal expansion.

18. Method according to claim 6, characterized in that a cavity (5) between the female tool (2) and the male tool (1) in its end position is at least as wide as the drawn sheeting without expansion and not wider than the thickness of the drawn sheeting in a state of maximal expansion.

19. Method according to claim 12, characterized in that a cavity (5) between the female tool (2) and the male tool (1) in its end position is at least as wide as the drawn sheeting without expansion and not wider than the thickness of the drawn sheeting in a state of maximal expansion.

20. Method according to claim 13, characterized in that a cavity (5) between the female tool (2) and the male tool (1) in its end position is at least as wide as the drawn sheeting without expansion and not wider than the thickness of the drawn sheeting in a state of maximal expansion.

* * * * *